(12) United States Patent
Luo et al.

(10) Patent No.: US 11,540,274 B2
(45) Date of Patent: Dec. 27, 2022

(54) EFFICIENT SIGNALING OF RESOURCE PATTERN IN INTEGRATED-ACCESS AND BACKHAUL (IAB) NETWORKS

(71) Applicant: QUALCOMM Incorporated, San Diego, CA (US)

(72) Inventors: Jianghong Luo, Skillman, NJ (US); Navid Abedini, Somerset, NJ (US); Luca Blessent, Whitehouse Station, NJ (US); Junyi Li, Chester, NJ (US); Tao Luo, San Diego, CA (US); Karl Georg Hampel, Hoboken, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 150 days.

(21) Appl. No.: 16/862,365

(22) Filed: Apr. 29, 2020

(65) Prior Publication Data

US 2020/0351874 A1    Nov. 5, 2020

Related U.S. Application Data

(60) Provisional application No. 62/843,236, filed on May 3, 2019.

(51) Int. Cl.
*H04W 72/04* (2009.01)

(52) U.S. Cl.
CPC .............................. *H04W 72/0446* (2013.01)

(58) Field of Classification Search
CPC . H04W 72/0446; H04W 40/22; H04W 16/10; H04W 28/16; H04L 5/0032; H04L 5/0094; H04L 5/0005; H04L 5/001; H04L 5/0053; H04L 27/0006; H04B 7/15542
See application file for complete search history.

(56) References Cited

U.S. PATENT DOCUMENTS

| | | | |
|---|---|---|---|
| 9,450,721 B2 * | 9/2016 | Park | H04L 5/0048 |
| 2018/0242291 A1 * | 8/2018 | Moon | H04L 1/1854 |
| 2018/0359781 A1 * | 12/2018 | Yoon | H04W 16/10 |
| 2019/0306846 A1 * | 10/2019 | Luo | H04L 1/18 |
| 2019/0349079 A1 * | 11/2019 | Novlan | H04B 7/15542 |

(Continued)

OTHER PUBLICATIONS

Qualcomm, Resource Coordination across IAB Topology, Apr. 20, 2018, 3GPP TSG-RAN WG2 Meeting #101 bis, R2-1804865 (Year: 2018).*

(Continued)

*Primary Examiner* — Tejis Daya
(74) *Attorney, Agent, or Firm* — Arent Fox, LLP

(57) ABSTRACT

In an aspect, the present disclosure includes a method, apparatus, and non-transitory computer readable medium for wireless communications for a donor node to provide a resource pattern over an integrated access and backhaul (IAB) backhaul. The aspect may include determining, at a central unit (CU) of the donor node, a configuration of a resource pattern for a plurality of IAB-nodes of an IAB network, wherein the configuration of the resource pattern includes a base resource pattern configured with a base periodicity of one or more slots and a plurality of distributed unit (DU) slot format indices within the base periodicity. The aspect may include transmitting, by the CU of the donor node, the resource pattern to one or more of the plurality of IAB-nodes of the IAB network.

20 Claims, 15 Drawing Sheets

(56) References Cited

U.S. PATENT DOCUMENTS

| | | | | |
|---|---|---|---|---|
| 2020/0145997 | A1* | 5/2020 | Luo | H04W 72/042 |
| 2020/0287615 | A1* | 9/2020 | Zhu | H04B 7/155 |
| 2020/0374170 | A1* | 11/2020 | Liu | H04L 5/0048 |
| 2022/0110179 | A1* | 4/2022 | Sheng | H04W 76/19 |

OTHER PUBLICATIONS

Qualcomm Inc., Resource Coordination across IAB Topology, Apr. 20, 2018, 3GPP TSG-RAN WG2 Meeting #101 bis, R2-1804865 (Year: 2018).*

AT&T: "Enhancements to support NR Backhaul Links", 3GPP Draft, 3GPP TSG RAN WG1 Meeting #95, R1-1812859, 3rd Generation Partnership Project (3GPP), Mobile Competence Centre, 650, Route Des Lucioles, F-06921 Sophia-Antipolis Cedex, France, vol. RAN WG1, No. Chengdu, China, Oct. 8, 2018-Oct. 12, 2018, Nov. 11, 2018 (Nov. 11, 2018), XP051554822,13 pages, Retrieved from the Internet: URL: http://www.3gpp.org/ftp/Meetings%5F3GPP%5FSYNC/RAN1/Docs/R1%2D1812859%2Ezip, [retrieved on Nov. 11, 2018], p. 6, paragraph 2.3—p. 10, paragraph 2.5, figures 7-10, p. 12, Line 1-Line 2, Section 1. Introduction Section 2: Physical Layer Enhancement for IAB, Section 2.3: Frame structure design and access and backhaull multiplexing Section 2.5: Cross-link interference considerations.

AT&T: "Mechanisms for Supporting Access and Backhaul Link Multiplexing", GPP Draft, 3GPP TSG RAN WG1 #96, R1-1901892, 3rd Generation Partnership Project (3GPP), Mobile Competence Centre, 650, Route Des Lucioles, F-06921 Sophia-Antipolis Cedex, France, vol. RAN WG1, No. Athens, Greece, Feb. 25, 2019-Mar. 1, 2019, Feb. 16, 2019 (Feb. 16, 2019), XP051599586, 9 Pages, Retrieved from the Internet: URL: http://www.3gpp.org/ftp/tsg%5Fran/WG1%5FRL1/TSGR1%5F96/Docs/R1%2D1901892%2Ezip, [retrieved on Feb. 16, 2019], p. 5, paragraph 2.2—p. 6, figures 4, 6.

International Search Report and Written Opinion—PCT/US2020/030876—ISAEPO—dated Aug. 6, 2020.

Qualcomm Incorporated: "IAB Resource Management", 3GPP Draft, 3GPP TSG WG1 Meeting #94, R1-1809444, 3rd Generation Partnership Project (3GPP), Mobile Competence Centre, 650, Route Des Lucioles, F-06921, Sophia-Antipolis Cedex, France, vol. RAN WG1, No. Gothenburg, Sweden, Aug. 20, 2018-Aug. 24, 2018, Aug. 17, 2018 (Aug. 17, 2018), 6 Pages, XP051516809, Retrieved from the Internet: URL: http://www.3gpp.org/ftp/tsg%5Fran/WG1%5FRL1/TSGR1%5F94/Docs/R1%2D1809444%2Ezip [retrieved on Aug. 17, 2018], pp. 2-5, 2.1 Baseline Approach; Semi-Static Resource Partitioning p. 5, 2.2 Enhanced Approach: Dynamic Resource Coordination Figures 2, 4, 5, Sections 2-3.

Qualcomm Incorporated: "Updated IAB Resource Management Framework", 3GPP Draft, 3GPP TSG RAN WG1 Meeting #96bis, R1-1905006 7.2.3.3—Updated IAB Resource Management Framework, 3rd Generation Partnership Project (3GPP), Mobile Competence Centre, 650, Route Des Lucioles, F-06921 Sophia-Antipolis Ced, vol. RAN WG1, No. Xi'an, China, Apr. 8, 2019-Apr. 12, 2019, Apr. 7, 2019 (Apr. 7, 2019), XP051700121, 8 Pages, Retrieved from the Internet: URL: http://www.3gpp.org/ftp/Meetings%5F3GPP%5FSYNC/RAN1/Docs/R1%2D1905006%2Ezip, [retrieved on Apr. 7, 2019], Figures 1, 2, 4, 5, Paragraph [0002]—Paragraph [0003], Figures.

* cited by examiner

A table of DU Slot Formats with L=16 Entries

| DUSlotFmt | pattern within a slot |
|---|---|
| 0 | all Hard |
| 1 | all Soft |
| 2 | all NA |
| 3 | Hard(3) Soft(9) Hard(2) |
| 4 | NA(2) Hard(8) NA(4) |
| 5 | NA(4) Hard(8) NA(2) |
| 6-15 | Other combinations |

Format supporting Hard resources for control symbols at both ends of a slot, and soft resources for PDSCH/PUSCH in the middle of a slot.

Formats supporting SSB marked as Hard inside a NA slot.

Other formats that may be commonly used

Determining, at a central unit (CU) of the donor node, a configuration of a resource pattern for a plurality of IAB-nodes of an Integrated-Access and Backhaul (IAB) network, wherein the configuration of the resource pattern includes a base resource pattern configured with a base periodicity of one or more slots and a plurality of distributed unit (DU) slot format indices within the base periodicity

1120

Transmitting, by the CU of the donor node, the resource pattern to one or more of the plurality of IAB-nodes of the IAB network

*FIG. 11*

EFFICIENT SIGNALING OF RESOURCE PATTERN IN INTEGRATED-ACCESS AND BACKHAUL (IAB) NETWORKS

CROSS-REFERENCE TO RELATED APPLICATION(S)

The present application claims benefit of U.S. Provisional Application No. 62/843,236 entitled "EFFICIENT SIGNALING OF RESOURCE PATTERN IN INTEGRATED-ACCESS AND BACKHAUL (IAB) NETWORKS" filed May 3, 2019, and is assigned to the assignee hereof and hereby expressly incorporated by reference herein.

BACKGROUND

Aspects of the present disclosure relate generally to wireless communication networks, and more particularly, to integrated access and backhaul (IAB) networks.

Wireless communication networks are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, orthogonal frequency-division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as new radio (NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information. As the demand for mobile broadband access continues to increase, however, further improvements in NR communications technology and beyond may be desired.

For example, for NR communications technology and beyond, current backhaul solutions may not provide a desired level of speed or customization for efficient operation. Thus, improvements in wireless communication operations may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, the present disclosure includes a method, apparatus, and computer readable medium for wireless communications for a donor node to provide a resource pattern over an integrated access and backhaul (IAB) backhaul. The aspect may include determining, at a central unit (CU) of the donor node, a configuration of a resource pattern for a plurality of IAB-nodes of an IAB network, wherein the configuration of the resource pattern includes a base resource pattern configured with a base periodicity of one or more slots and a plurality of distributed unit (DU) slot format indices within the base periodicity. The aspect may include transmitting, by the CU of the donor node, the resource pattern to one or more of the plurality of IAB-nodes of the IAB network.

In a further example, an apparatus for wireless communication is provided that includes a transceiver, a memory configured to store instructions, and one or more processors communicatively coupled with the transceiver and the memory. The one or more processors are configured to execute the instructions for a donor node to provide a resource pattern over an IAB backhaul. The aspect may include the one or more processors being configured to execute the instructions for determining, at a CU of the donor node, a configuration of a resource pattern for a plurality of IAB-nodes of an IAB network, wherein the configuration of the resource pattern includes a base resource pattern configured with a base periodicity of one or more slots and a plurality of DU slot format indices within the base periodicity. The aspect may include the one or more processors being configured to execute the instructions for transmitting, by the CU of the donor node, the resource pattern to one or more of the plurality of IAB-nodes of the IAB network.

In another aspect, an apparatus for wireless communication is provided that includes means for a donor node to provide a resource pattern over an IAB backhaul. The aspect may include means for determining, at a CU of the donor node, a configuration of a resource pattern for a plurality of IAB-nodes of an IAB network, wherein the configuration of the resource pattern includes a base resource pattern configured with a base periodicity of one or more slots and a plurality of DU slot format indices within the base periodicity. The aspect may include means for transmitting, by the CU of the donor node, the resource pattern to one or more of the plurality of IAB-nodes of the IAB network.

In yet another aspect, a non-transitory computer-readable medium is provided including code executable by one or more processors for a donor node to provide a resource pattern over an IAB backhaul. The aspect may include code for determining, at a CU of the donor node, a configuration of a resource pattern for a plurality of IAB-nodes of an IAB network, wherein the configuration of the resource pattern includes a base resource pattern configured with a base periodicity of one or more slots and a plurality of DU slot format indices within the base periodicity. The aspect may include code for transmitting, by the CU of the donor node, the resource pattern to one or more of the plurality of IAB-nodes of the IAB network.

In another aspect, the present disclosure includes a method, apparatus, and computer readable medium for wireless communications for a donor node to provide a resource pattern over an IAB backhaul. The aspect may include receiving, at a DU of the IAB-node, a resource pattern from a CU of an IAB donor node via one or more IAB-nodes in an IAB network, the resource pattern corresponding to a base resource pattern configured with a base periodicity of two or more slots and a plurality DU slot format indices within the base periodicity. The aspect may include determining a scheduling behavior based at least on the resource pattern. The aspect may include communicating with one or more additional neighboring IAB-nodes of the IAB network based on the scheduling behavior associated with the resource pattern.

In a further example, an apparatus for wireless communication is provided that includes a transceiver, a memory configured to store instructions, and one or more processors communicatively coupled with the transceiver and the memory. The one or more processors are configured to execute the instructions for a donor node to provide a resource pattern over an IAB backhaul. The aspect may include the one or more processors being configured to execute the instructions for receiving, at a DU of the IAB-node, a resource pattern from a CU of an IAB donor node via one or more IAB-nodes in an IAB network, the resource pattern corresponding to a base resource pattern configured with a base periodicity of two or more slots and a plurality DU slot format indices within the base periodicity. The aspect may include the one or more processors being configured to execute the instructions for determining a scheduling behavior based at least on the resource pattern. The aspect may include one or more processors being configured to execute the instructions for communicating with one or more additional neighboring IAB-nodes of the IAB network based on the scheduling behavior associated with the resource pattern.

In another aspect, an apparatus for wireless communication is provided that includes means for a donor node to provide a resource pattern over an IAB backhaul. The aspect may include means for receiving, at a DU of the IAB-node, a resource pattern from a CU of an IAB donor node via one or more IAB-nodes in an IAB network, the resource pattern corresponding to a base resource pattern configured with a base periodicity of two or more slots and a plurality DU slot format indices within the base periodicity. The aspect may include means for determining a scheduling behavior based at least on the resource pattern. The aspect may include means for communicating with one or more additional neighboring IAB-nodes of the IAB network based on the scheduling behavior associated with the resource pattern.

In yet another aspect, a non-transitory computer-readable medium is provided including code executable by one or more processors for a donor node to provide a resource pattern over an IAB backhaul. The aspect may include code for receiving, at a DU of the IAB-node, a resource pattern from a CU of an IAB donor node via one or more IAB-nodes in an IAB network, the resource pattern corresponding to a base resource pattern configured with a base periodicity of two or more slots and a plurality DU slot format indices within the base periodicity. The aspect may include code for determining a scheduling behavior based at least on the resource pattern. The aspect may include code for communicating with one or more additional neighboring IAB-nodes of the IAB network based on the scheduling behavior associated with the resource pattern.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which:

FIG. 8 is a diagram of an example of a table of DU slot formats;

FIG. 11 is a flow diagram of an example of a method of operating a donor node to provide a resource pattern over a wireless backhaul;

DETAILED DESCRIPTION

Figure 1A:
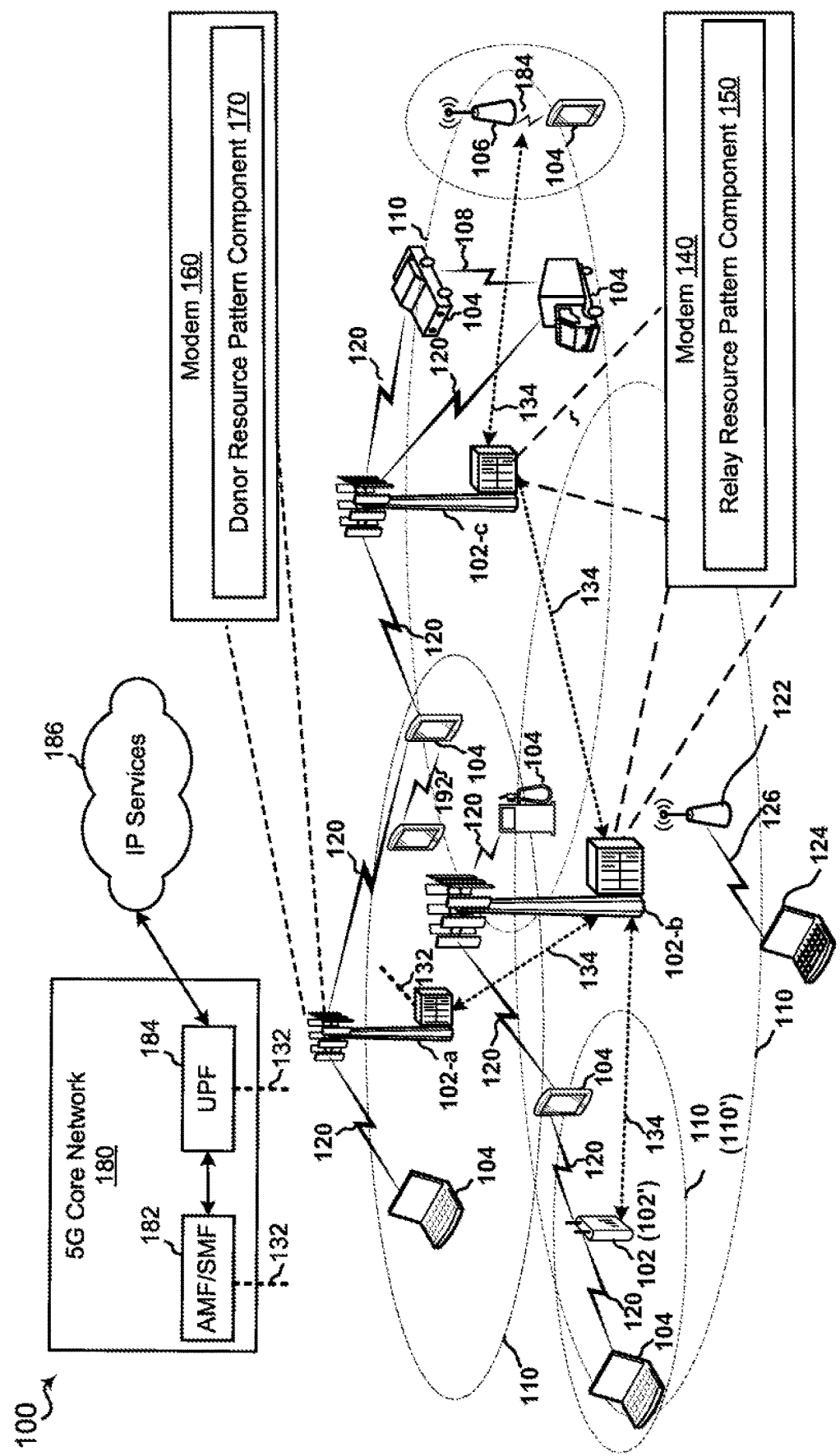
FIG. 1A is a schematic diagram of an example wireless communication network having nodes including relay resource pattern configuration components and/or donor resource pattern configuration components configured according to the present disclosure to provide resource patterns over a wireless backhaul.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. Additionally, the term "component" as used herein may be one of the parts that make up a system, may be hardware, firmware, and/or software stored on a computer-readable medium, and may be divided into other components.

The present disclosure generally relates to wireless backhaul networks using cellular radio access technologies (RAT) such as Integrated-Access and Backhaul (IAB) networks.

More specifically, the present disclosure addresses a problem relating to configuring resource patterns in such wireless backhaul networks. Resource management framework and supported resource types in IAB networks provide efficient signaling formats for configuration of resource patterns for IAB network. Flexible formats with reasonable signaling overhead to support a plurality of resource patterns in IAB networks. For example, the resource pattern may support configuration of per DU, per DU-cell, or per child backhaul link of a DU. Further, the resource pattern may support different patterns at different slots due to presence of other semi-static configuration. In an example, cell-specific signals/channels such as SSB, PRACH, broadcast system information, scheduling request, periodic CSI-RS, etc.

Generally, the present disclosure describes a configuration of resource patterns. For example, in an aspect, the present disclosure includes a method, apparatus, and computer readable medium for wireless communications for a donor node to provide a resource pattern over an IAB backhaul. The aspect may include determining, at a central unit (CU) of the donor node, a configuration of a resource pattern for a plurality of IAB-nodes of an Integrated-Access and Backhaul (IAB) network, wherein the configuration of the resource pattern includes a base resource pattern configured with a base periodicity of one or more slots and a plurality of distributed unit (DU) slot format indices within the base periodicity. The aspect may include transmitting, by the CU of the donor node, the resource pattern to one or more of the plurality of IAB-nodes of the IAB network.

In another aspect, the present disclosure includes a method, apparatus, and computer readable medium for wireless communications for a donor node to provide a resource pattern over an IAB backhaul. The aspect may include receiving, at a DU of the IAB-node, a resource pattern from a CU of an IAB donor node via one or more IAB-nodes in an IAB network, the resource pattern corresponding to a base resource pattern configured with a base periodicity of two or more slots and a plurality DU slot format indices within the base periodicity. The aspect may include determining a scheduling behavior based at least on the resource pattern. The aspect may include communicating with one or more additional neighboring IAB-nodes of the IAB network based on the scheduling behavior associated with the resource pattern Additional features of the present aspects are described in more detail below with respect to FIGS. 1-14.

It should be noted that the techniques described herein may be used for various wireless communication networks such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes LTE/LTE-A and 5G systems for purposes of example, and LTE and 5G terminology is used in much of the description below, although the techniques may be applicable to other next generation communication systems.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Referring to FIG. 1A, in accordance with various aspects of the present disclosure, an example wireless communication network 100 includes at least one base station 102-b, 102-c with a modem 140 having a relay resource pattern component 150 that receives a resource pattern and communicates using the resource pattern over a wireless backhaul 134. As illustrated, the base stations 102-b and 102-c may not have a direct backhaul link 132 (e.g., NG interface) to the 5G core network 180. The term "IAB-node" may refer to an IAB-node without a direct backhaul link to a core network. In contrast, the term "donor node" may refer to an IAB-donor with a direct backhaul link to the core network. Further, the wireless communication network 100, also referred to as a wireless wide area network (WWAN), includes at least one base station 102-a with a modem 160 having a donor resource pattern component 170 that provides resource patterns for a wireless backhaul 134. The base station 102-a may be a donor node that includes a backhaul link 132 to the core network 180. The IAB-nodes of base stations 102-b and 102-c may establish the wireless backhaul 134 via the donor node of base station 102-a.

The base stations 102 (which may alternatively be referred to as gNodeBs (gNB)) interface with the 5G core network 180 through backhaul links 132 (e.g., NG interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the 5G core network 180) with each other over backhaul links 132, 134 (e.g., X2 interface). The backhaul links 132, 134 may be wired or wireless. In an aspect, the present disclosure relates to a network where at least some of the backhaul links 134 are wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs) and/or gNBs, which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Y*x MHz (where x is a number of component carriers) used for transmission in each direction. The carriers may or may not be adjacent to or contiguous with each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 108. The D2D communication link 108 may use the DL/UL WWAN spectrum. The D2D communication link 108 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 122 in communication with Wi-Fi stations (STAs) 124 via communication links 126 in a 5 GHz unlicensed frequency spectrum. When communicating in an unlicensed frequency spectrum, the STAs 124/AP 122 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 122. The small cell 102', employing NR in an unlicensed frequency spectrum, may boost coverage to and/or increase capacity of the access network.

The gNodeB (gNB) 106 may operate in millimeter wave (mmW) frequencies and/or near mmW frequencies in communication with the UE 104. When the gNB 106 operates in mmW or near mmW frequencies, the gNB 106 may be referred to as a mmW base station. In an aspect, the gNB 106 may be a gNB distributed unit (gNB-DU) connected to another base station 102 via a wireless backhaul 134. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW gNB 106 may utilize beamforming 184 with the UE 104 to compensate for the extremely high path loss and short range.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the 5G core network 180 for one or more UEs 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The communication networks that may accommodate some of the various disclosed examples may be packet-based networks that operate according to a layered protocol stack and data in the user plane may be based on the IP. A user plane protocol stack (e.g., packet data convergence protocol (PDCP), radio link control (RLC), MAC, etc.), may perform packet segmentation and reassembly to communicate over logical channels. For example, a MAC layer may perform priority handling and multiplexing of logical channels into transport channels. The MAC layer may also use hybrid automatic repeat/request (HARD) to provide retransmission at the MAC layer to improve link efficiency. In the control plane, the RRC protocol layer may provide establishment, configuration, and maintenance of an RRC connection between a UE 104 and the base stations 102. The RRC protocol layer may also be used for core network 180 support of radio bearers for the user plane data. At the physical (PHY) layer, the transport channels may be mapped to physical channels.

In an aspect, the base stations 102-b and 102-c may be IAB-nodes where the modem 140 includes a relay resource pattern component 150 that utilizes resource patterns received for communication among the base stations 102. For example, the base station 102-c may be an access IAB-node that maps radio access channels to radio backhaul channels and the base station 102-b may be an intermediate IAB-node that maps backhaul radio channels with a first peer base station (e.g., base station 102-c) to backhaul radio channels with a second peer base station (e.g., base station 102-a). A peer base station may refer to a base station with which the base station has established a backhaul link. The relay resource pattern component 150 may receive, at a distributed unit (DU) of the IAB-node, a resource pattern from a neighboring IAB-node in the IAB network, the resource pattern corresponding to a base resource pattern configured with a base periodicity of two or more slots and a plurality DU slot format indices within the base periodicity. The relay resource pattern component 150 may further determine a scheduling behavior based at least on the resource pattern. The relay resource pattern component 150 may communicate with one or more additional neighboring IAB-nodes of the IAB network based on the scheduling behavior associated with the resource pattern.

In an aspect, the base station 102-a may be a donor node where the modem 160 includes a donor resource pattern component 170 that provides a resource pattern to IAB-nodes of the JAB network. The donor resource pattern component 170 may determine, at a central unit (CU) of the donor node, a configuration of a resource pattern for a plurality of IAB-nodes of an IAB network, wherein the configuration of the resource pattern includes a base resource pattern configured with a base periodicity of two or more slots and a plurality of DU slot format indices within the base periodicity. The donor resource pattern component 170 may further transmit, by the CU of the donor node, the resource pattern to one or more of the plurality of IAB-nodes of the IAB network.

The base stations 102 and the UEs 104 are able to communicate to a network through a 5G core network 180. The core network 180 may include an Access and Mobility Management Function/Session Management Function (AMF/SW) entity 182, User Plane Function (UPF) 184 and other entity or components for communicating packet data units (PDUs).

Figure 1B:
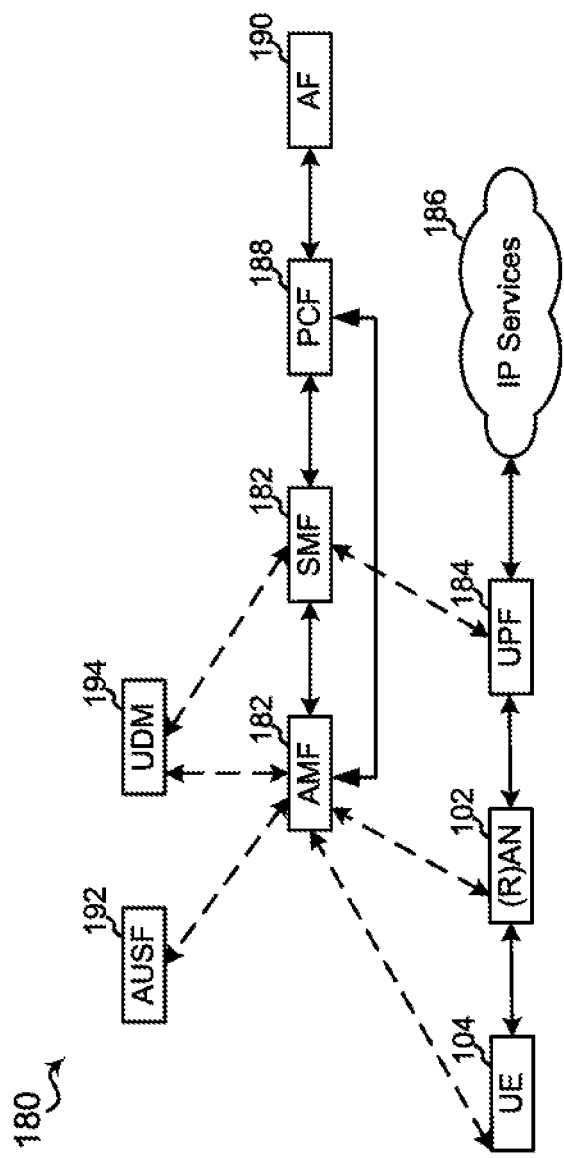
FIG. 1B is a schematic diagram of an example 5G core network.

Referring to FIG. 1B, a schematic diagram of the 5G core network 180 is illustrated. As shown, the 5G core network 180 may include an Authentication Server Function (AUSF) 192, Unified Data Management (UDM) 194, AMF/SMF entity 182 (shown as two elements), Policy Control Information (PCF) 188 and Application Function (AF) 190, as well as other components for a network (e.g., IP Services 186) to communicate with a UE 104 and a random access network (RAN) (which can include one or more base stations 102).

The AMF 182 provides several functions including, but not limited to, registration management, connection management, reachability management, mobility management, access authentication, access authorization, location services management, and EPS bearer ID allocation. The SMF 182 provides several functions including, but not limited to, session management, UE IP address allocation and management, ARP proxying and/or neighbor solicitation proxying, selection and control of UP function, configures traffic steering at UPF to route traffic to proper destinations, termination of interfaces towards policy control functions, lawful intercepts, control and coordination of charging data collection at the UPF, termination of SM parts of NAS messages, downlink data notification and roaming functionality. The UPF 184 provides several functions including, but not limited to, anchor point for intra/inter-RAT mobility, external PDU session point of interconnect to data network (e.g., IP services 186), packet inspection, user plane part of policy rule information, lawful intercepts, traffic usage reporting, QoS handling for user plane, uplink traffic verification, transport level packet marking in the uplink and downlink, sending and forwarding one or more "end marker," and ARP proxying and/or neighbor soliciting proxying. The AUSF 192 handles authentication of the components within the 5G core network 180. The UDM 194 provides several functions including, but not limited to, generation of authentication credentials, user identification handling, access authorization, support for service/session continuity, subscription management and SMS management. The PCF 188 provides several functions including, but not limited to, support for unified policy framework to govern network behavior, provides policy rules to control plane functions for enforcement, and accesses subscription information relevant for policy decision in the Unified Data Repository (UDR). The AF 190 provides several functions including, but not limited to, application influence on traffic routing, accessing network exposure function and interacting with policy framework for policy control.

Figure 2:
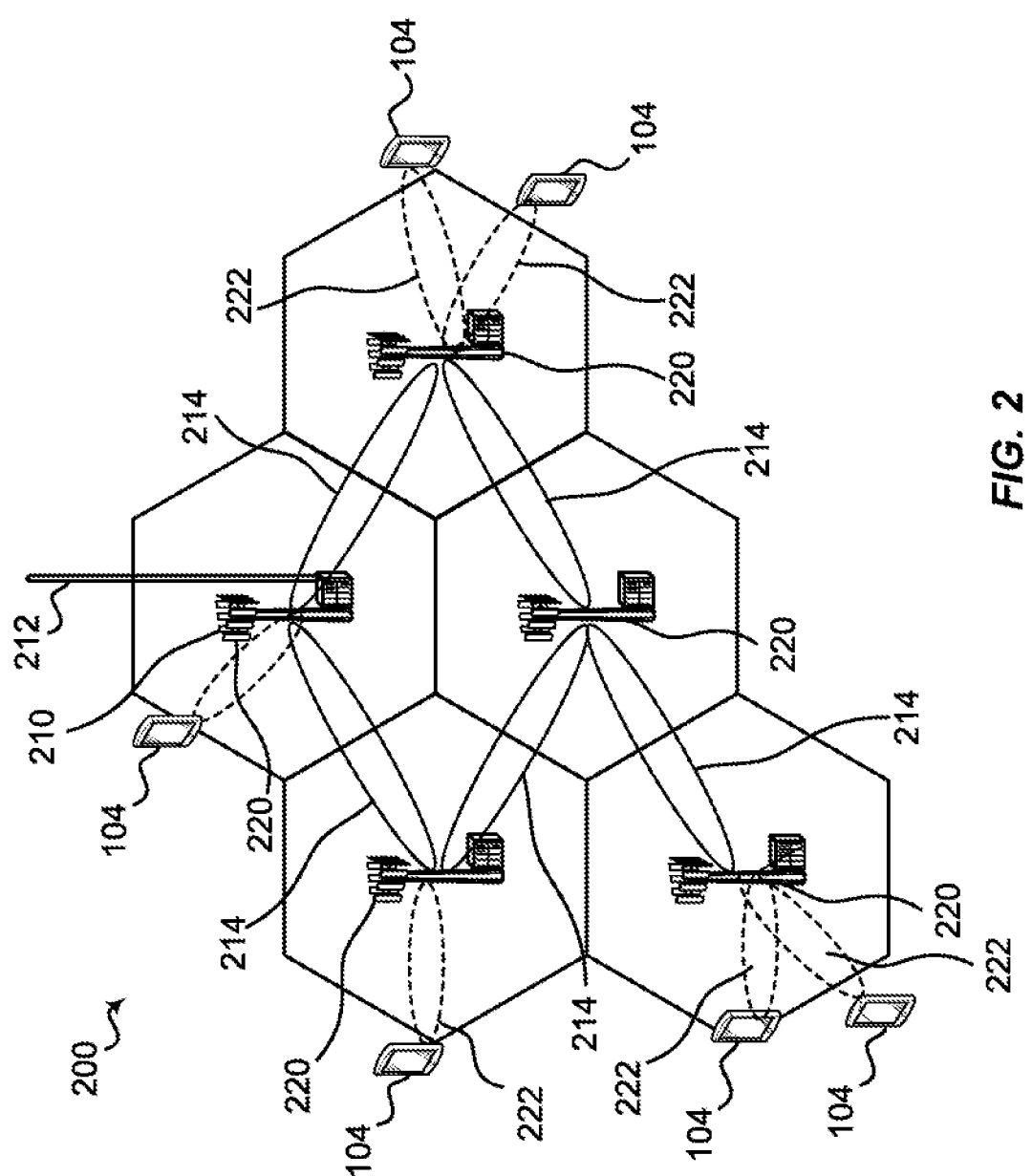
FIG. 2 is a network diagram of an example wireless backhaul network including IAB-nodes.

Referring to FIG. 2, an example of a wireless backhaul network 200 includes a donor node 210 and several IAB-nodes 220 providing access to UEs 104. Wireless backhauls 214 can provide range extension to a wireline backhaul 212 or fronthaul. A wireless backhaul network may support multiple backhaul hops as well as redundant connectivity, e.g. by providing multiple paths between a donor node 210 and a IAB-node 220. In this context, the donor node 210 provides the interface between the wireless network and the wireline network (e.g., 5G core network 180 (FIG. 1A)). One example for wireless backhauling is Integrated Access and Backhaul (IAB) mentioned in 3GPP Rel-15.

Cellular RATs provide QoS differentiation through the bearer concept. An access link 222 can support multiple bearers, such as data radio bearers (DRBs) or signaling radio bearers (SRBs). Each bearer may be assigned a different QoS-class and therefore provide a QoS-class-specific priority in data scheduling on the air interface. The scheduling decisions may include QoS-class prioritization as well as other predicates such as QoS-class-specific bit-rate- and latency guarantees or bit-rate limits. A UE 104 may simultaneously support multiple services pertaining to different QoS-classes through the establishment of multiple bearers where each bearer is assigned with a different QoS class.

Figure 3:
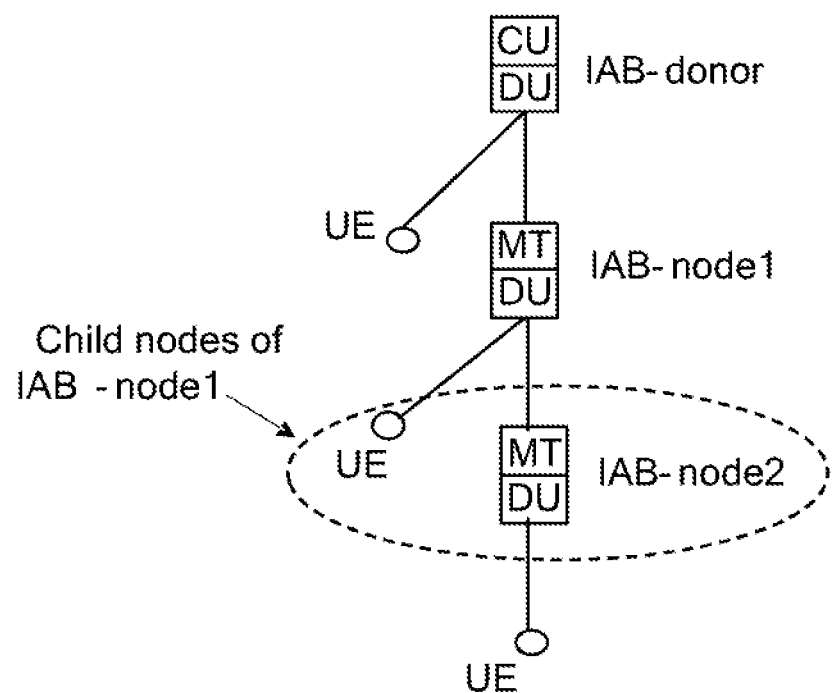
FIG. 3 is a network diagram of an example wireless backhaul network including a donor node and a plurality of child nodes.

Referring to FIG. 3, an example of an IAB-network 300 may include an IAB-donor and a plurality of IAB-nodes, where each IAB-node may serve as a scheduling node for a plurality of child nodes including child access UEs and/or child IAB-nodes.

Figure 4B:
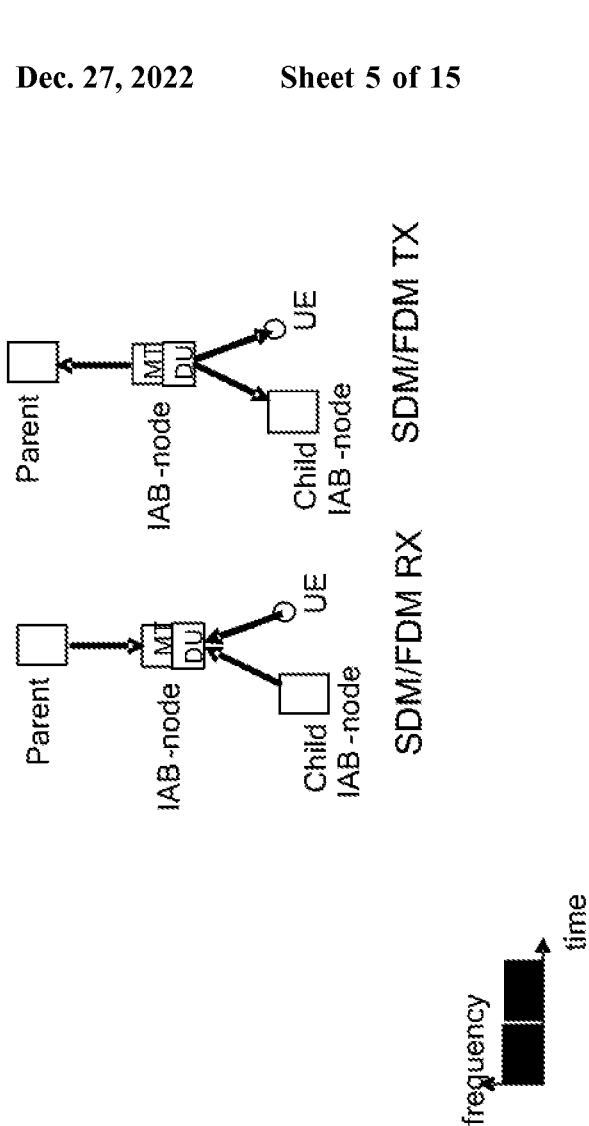
FIG. 4B is a network diagram of an example wireless backhaul network engaged in half-duplex frequency-division multiplexing (FDM) communications.
Figure 4A:
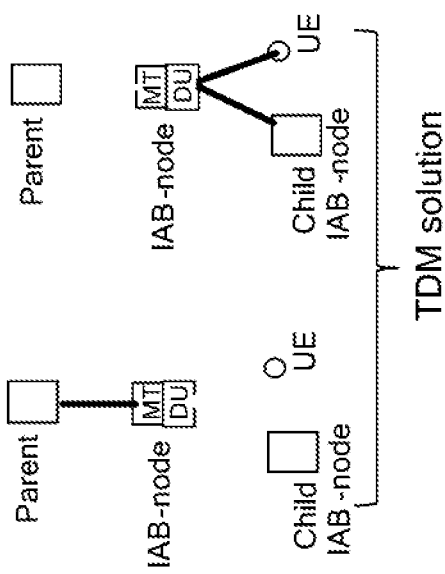
FIG. 4A is a network diagram of an example wireless backhaul network engaged in half-duplex time-division multiplexing (TDM) communications.

Referring to FIG. 4A, a network diagram 410 shows an example wireless backhaul network engaged in half-duplex time-division multiplexing (TDM) communications. That is, the IAB-node communicates with only one of the parent node or the child IAB-node(s) at a given time. Referring to FIG. 4B, a network diagram 420 shows an example of IAB-network engaged in a half-duplex FDM or SDM communications, where the IAB-node is either at a transmission mode over both parent and child links, or at a reception mode over parent and child links, and use FDM/SDM techniques to separate parent and child links.

Figure 5:
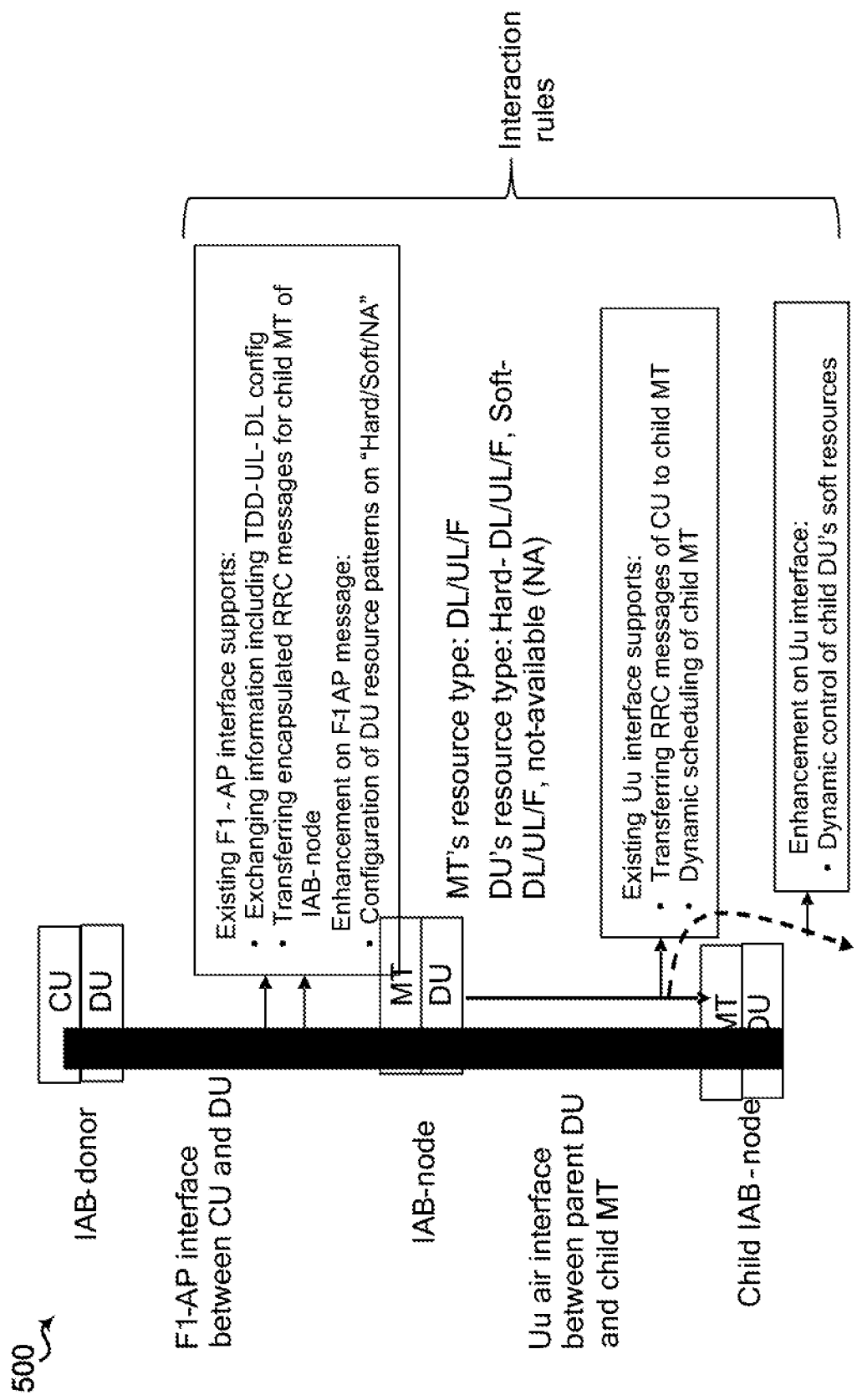
FIG. 5 is a diagram illustrating an example IAB resource management framework.

Referring to FIG. 5, an example diagram 500 illustrates an example IAB resource management framework. For example, the F1-AP interface between the CU and the DU supports exchanging information including TDD-UL-DL configuration and transferring encapsulated RRC messages for child MT of the IAB-node. An enhancement on the F1-AP message includes configuration of the DU resource patterns on Hard/Soft/NA. The Uu air interface between the parent DU and the child MT supports transferring RRC messages of CU to child MT and dynamic scheduling of the child MT. An enhancement on the Uu interface includes dynamic control of child DU's soft resources.

Figure 6:
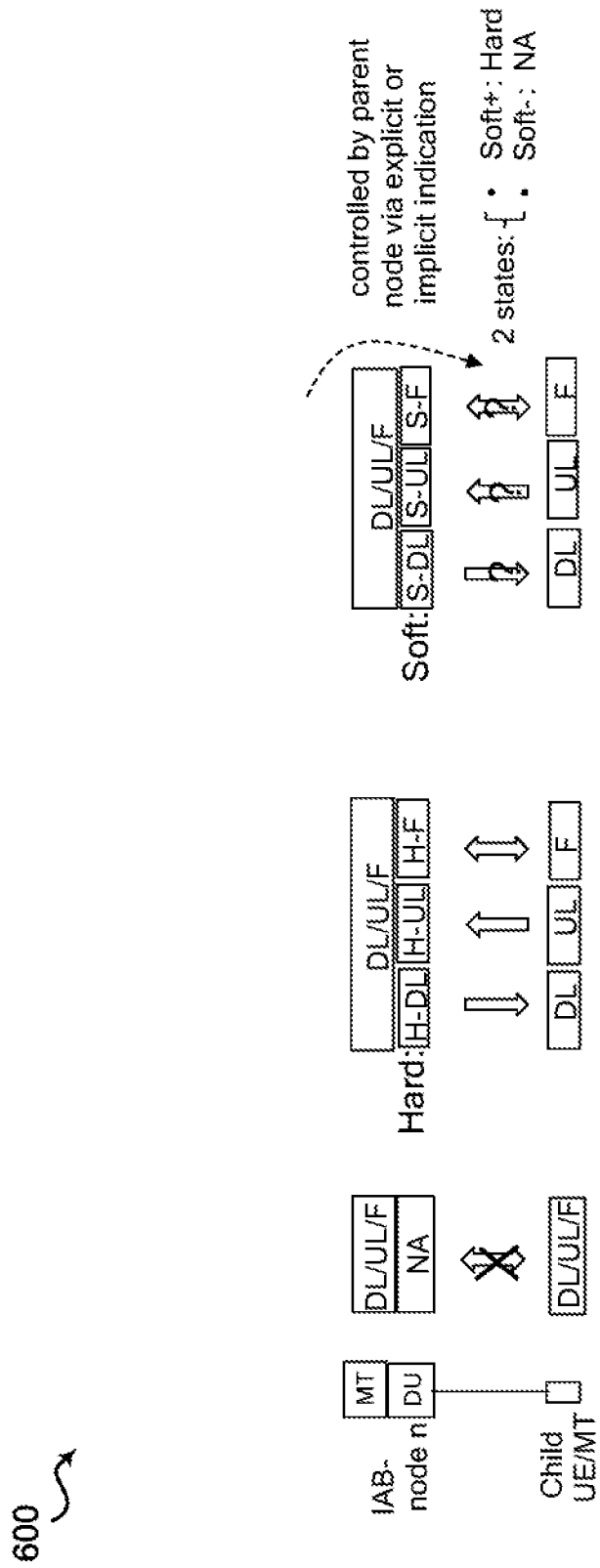
FIG. 6 is a diagram of examples of resource types for an IAB network.

Referring to FIG. 6, an example diagram 600 illustrates examples of resource types for an IAB network. The DU may assume that a hard resource (H) is available regardless of a configuration of a child UE or mobile terminal (MT). The DU may assume that a not available resource (NA) cannot be used. A soft resource may indicate that the resource may be used if indicated by a parent node through explicit or implicit signaling. A soft resource may have a soft+ state when indicated as available. The soft+ state may be similar to a hard resource. A soft resource may have a soft− state when indicated as not available. The soft− state may be similar to a NA resource.

Figure 7:
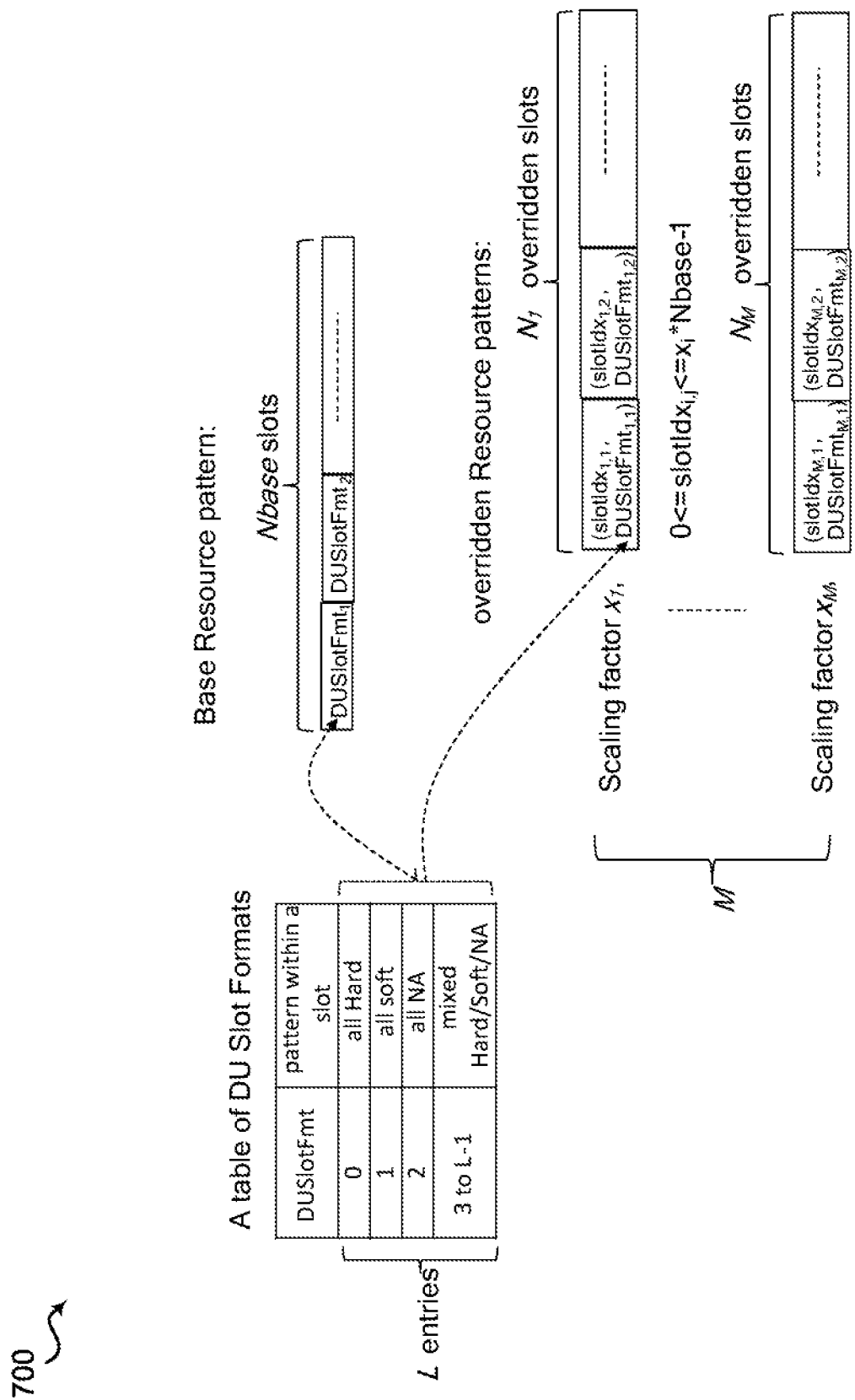
FIG. 7 is a diagram of an example of a semi-static configuration of a resource pattern.

Referring to FIG. 7, an example diagram 700 illustrates an example of a semi-static configuration of a resource pattern including a base resource pattern and overridden resource patterns. For example, each of the DU slot formats may have a corresponding pattern within a slot. In this example, DU slot format 0 has a corresponding all Hard pattern within the slot, DU slot format 1 has a corresponding all Soft pattern within the slot, DU slot format 2 has a corresponding all NA pattern within the slot, and DU slot formats 3 to L−1 have corresponding mixed Hard/Soft/NA patterns within the slot. Each of the DU slot formats have a base resource pattern that may be replaced with overridden resource patterns that include one or more scaling factors.

Referring to FIG. 8, an example diagram 800 illustrates an example of a table of DU slot formats to be used for base resource patterns (and override patterns). For example, each of the DU slot formats may include a corresponding pattern within each of the slots.

Figure 9:
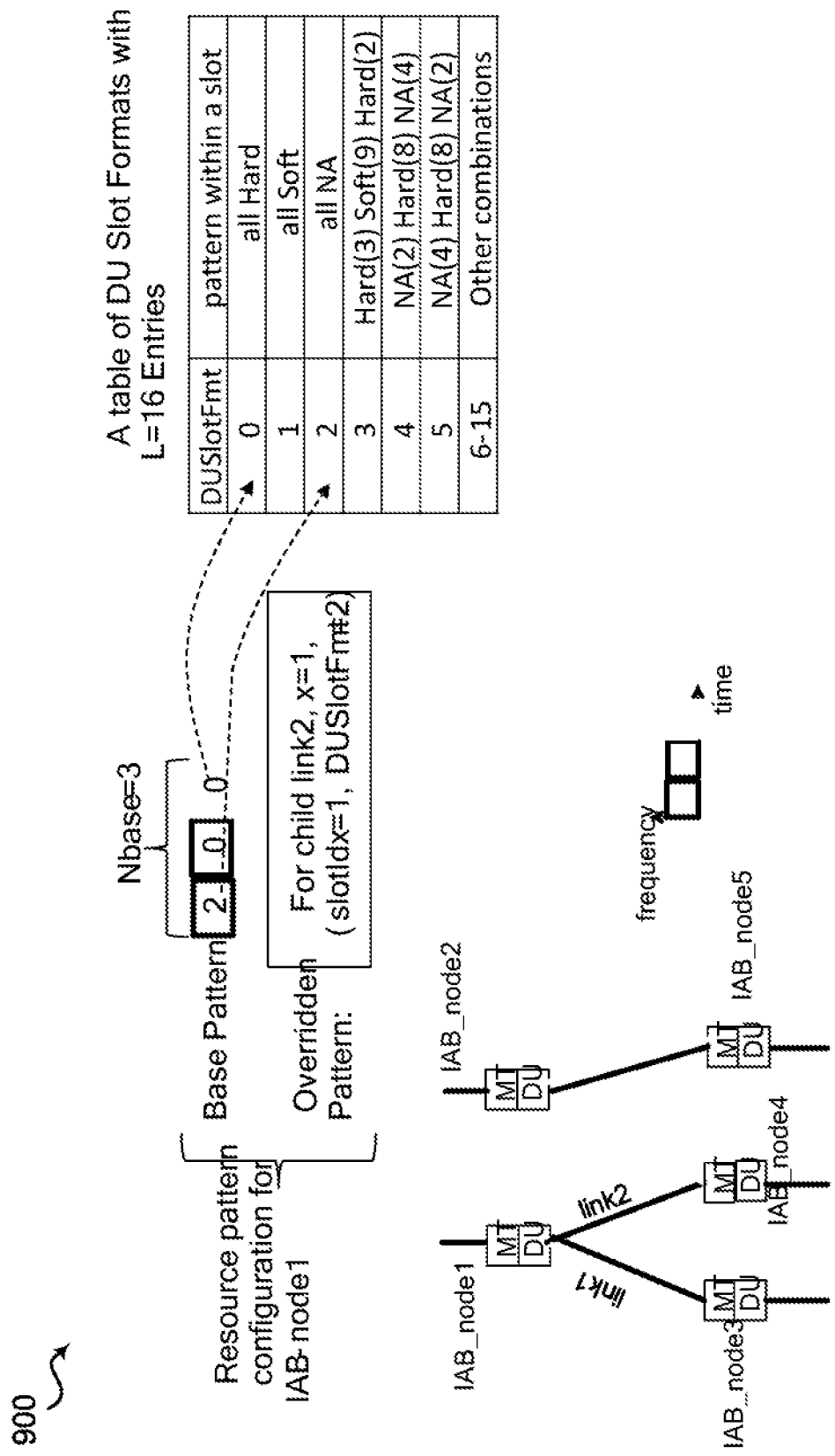
FIG. 9 is a diagram of an example of resource pattern configuration supporting per-link configuration.

Referring to FIG. 9, an example diagram 900 illustrates an example of resource pattern configuration supporting per-link configuration. For example, each resource pattern configuration for IAB-node 1 may include a base pattern and an overridden pattern. Each base pattern includes a number of DU slot formats with corresponding patterns within a slot.

Figure 10:
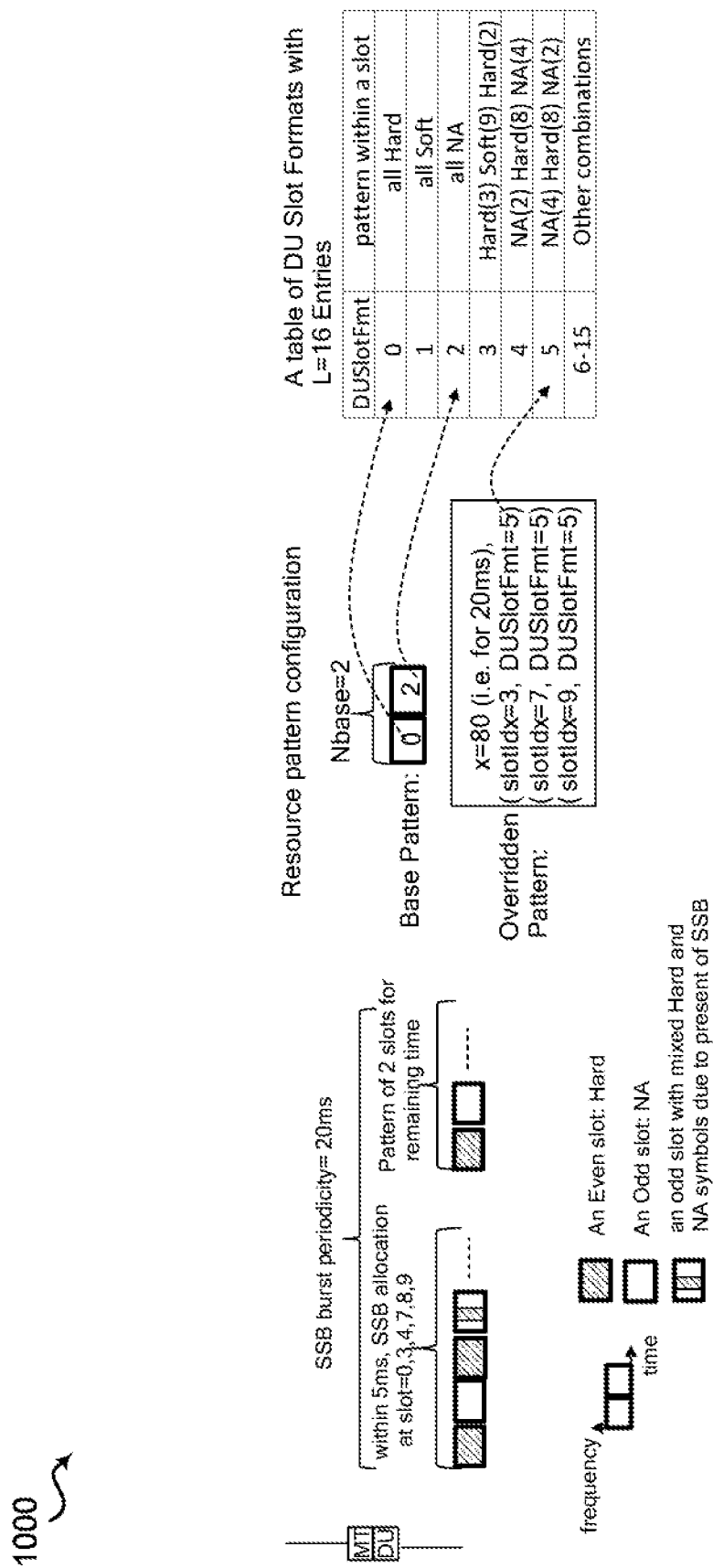
FIG. 10 is a diagram of an example of resource pattern configuration supporting cell-specific configuration.

Referring to FIG. 10, an example diagram 1000 illustrates an example resource pattern configuration supporting different patterns at slots with cell-specific signals/channels from a base pattern. For example, the resource pattern may be configured for even slots as Hard and odd slots as NA, but configure SSB symbols as Hard at NA slots.

Referring to FIG. 11, for example, a method 1100 of wireless communication in operating a donor node 102 according to the above-described aspects provides a resource pattern over an IAB backhaul includes one or more of the herein-defined actions.

For example, at 1110 method 1100 includes determining, at a central unit (CU) of the donor node, a configuration of a resource pattern for a plurality of IAB-nodes of an IAB network, wherein the configuration of the resource pattern includes a base resource pattern configured with a base periodicity of one or more slots and a plurality of DU slot format indices within the base periodicity. For instance, in an aspect, donor node 210 may execute donor resource pattern component 170 to determine, at a CU of the donor node 210, a configuration of a resource pattern for a plurality of IAB-nodes 220 of an IAB network, wherein the configuration of the resource pattern includes a base resource pattern configured with a base periodicity of two or more slots and a plurality of DU slot format indices within the base periodicity. Thus, donor node 210 and donor resource pattern component 170 may define the means for determining, at a central unit (CU) of the donor node, a configuration of a resource pattern for a plurality of IAB-nodes of an IAB network, wherein the configuration of the resource pattern includes a base resource pattern configured with a base periodicity of one or more slots and a plurality of DU slot format indices within the base periodicity.

In an aspect, method 1100 includes the configuration of the resource pattern further including one or more override pattern, each configured to replace the base resource pattern for one or more specified slots. For example, the overridden resource pattern is configured with a scaling factor and a plurality of overridden slots including a slot index and DU slot format for each of the plurality of overridden slots. Further, the slot index corresponds to a value between 0 and a maximum value calculated based on the base periodicity and the scaling factor. Additionally, the overridden resource pattern is configured per DU of each of the plurality of IAB-nodes of the IAB network or per DU-cell associated with one or more of the plurality of IAB-nodes of the IAB network.

In an aspect, method 1100 includes the DU slot format indices corresponding to a table of DU slot formats, the table of DU slot formats includes a plurality of entries, each entry indicating a pattern of a DU resource type at each symbol within a slot. For example, the DU resource type corresponds to at least one of a hard resource, soft resource, or not-available. Further, the base resource pattern is configured in an F1-AP interface for the one or more of the plurality of IAB-nodes of the IAB network. Additionally, the base resource pattern is configured per DU of each of the plurality of IAB-nodes of the IAB network or per DU-cell associated with one or more of the plurality of IAB-nodes of the IAB network.

At 1120, the method 1100 includes transmitting, by the CU of the donor node, the resource pattern to one or more of the plurality of IAB-nodes of the IAB network. For instance, in an aspect, donor node 210 may execute donor resource pattern component 170 to transmit, by the CU of the donor node 210, the resource pattern to one or more of the plurality of IAB-nodes 220 of the IAB network. Thus, donor node 210 and donor resource pattern component 170 may define the means for transmitting, by the CU of the donor node, the resource pattern to one or more of the plurality of IAB-nodes of the IAB network.

Figure 12:
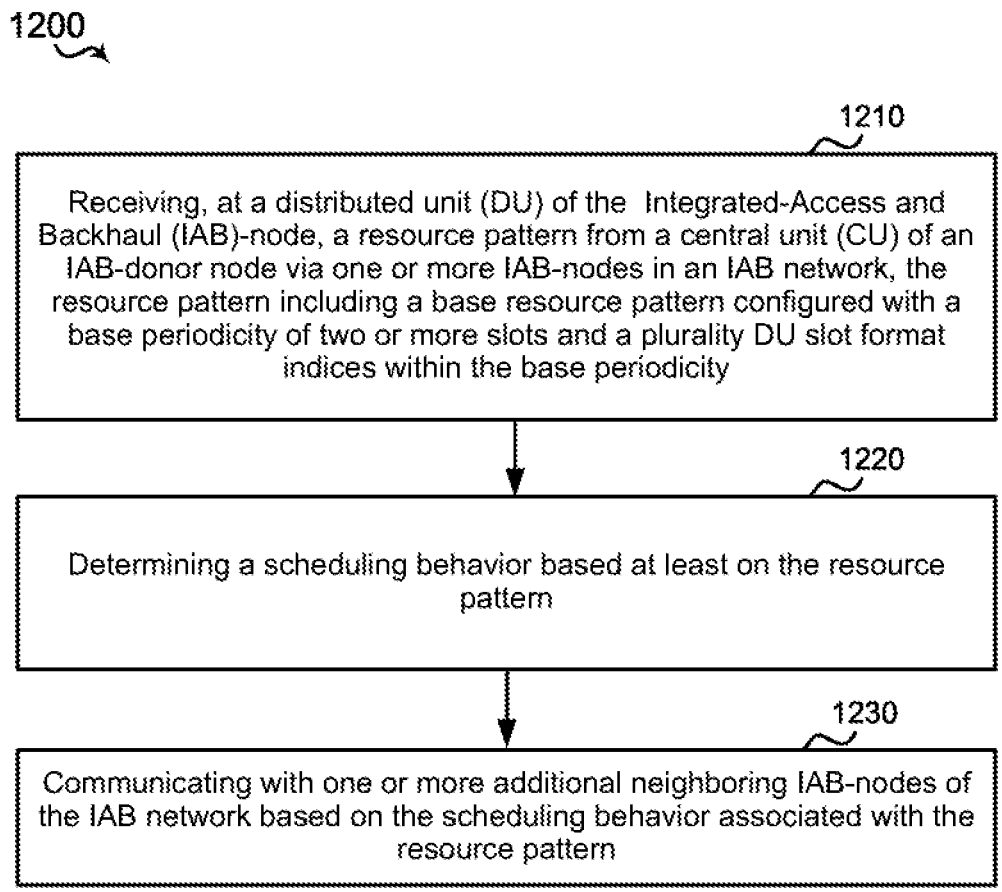
FIG. 12 is a flow diagram of an example of a method of operating a IAB-node to receive and communicate using a resource pattern over a wireless backhaul.

Referring to FIG. 12, for example, a method 1200 of wireless communication in operating a IAB-node 220 according to the above-described aspects to communicate utilizing a resource pattern over a wireless backhaul includes one or more of the herein-defined actions.

For example, at 1210 method 1200 includes receiving, at a DU of the IAB-node, a resource pattern from a CU of an IAB donor node via one or more IAB-nodes in an IAB network, the resource pattern including a base resource pattern configured with a base periodicity of two or more slots and a plurality DU slot format indices within the base periodicity. For instance, in an aspect, IAB-node 220 may execute relay resource pattern component 150 to receive, at a DU of the IAB-node, a resource pattern from a neighboring IAB-node in an IAB network, the resource pattern including a base resource pattern configured with a base periodicity of two or more slots and a plurality DU slot format indices within the base periodicity. Thus, IAB-node 220 and relay resource pattern component 150 may define the means for receiving, at a DU of the IAB-node, a resource pattern from a CU of an IAB donor node via one or more IAB-nodes in an IAB network, the resource pattern including a base resource pattern configured with a base periodicity of two or more slots and a plurality DU slot format indices within the base periodicity.

At 1220, the method 1200 includes determining a scheduling behavior based at least on the resource pattern. For instance, in an aspect, IAB-node 220 may execute relay resource pattern component 150 to determine a scheduling behavior based at least on the resource pattern. Thus, IAB-node 220 and relay resource pattern component 150 may define the means for determining a scheduling behavior based at least on the resource pattern.

At 1230, the method 1200 includes communicating with one or more additional neighboring IAB-nodes of the IAB network based on the scheduling behavior associated with the resource pattern. For instance, in an aspect, IAB-node 220 may execute relay resource pattern component 150 to communicate with one or more additional neighboring IAB-nodes of the IAB network based on the scheduling behavior associated with the resource pattern. Thus, IAB-node 220 and relay resource pattern component 150 may define the means for communicating with one or more additional neighboring IAB-nodes of the IAB network based on the scheduling behavior associated with the resource pattern.

Figure 13:
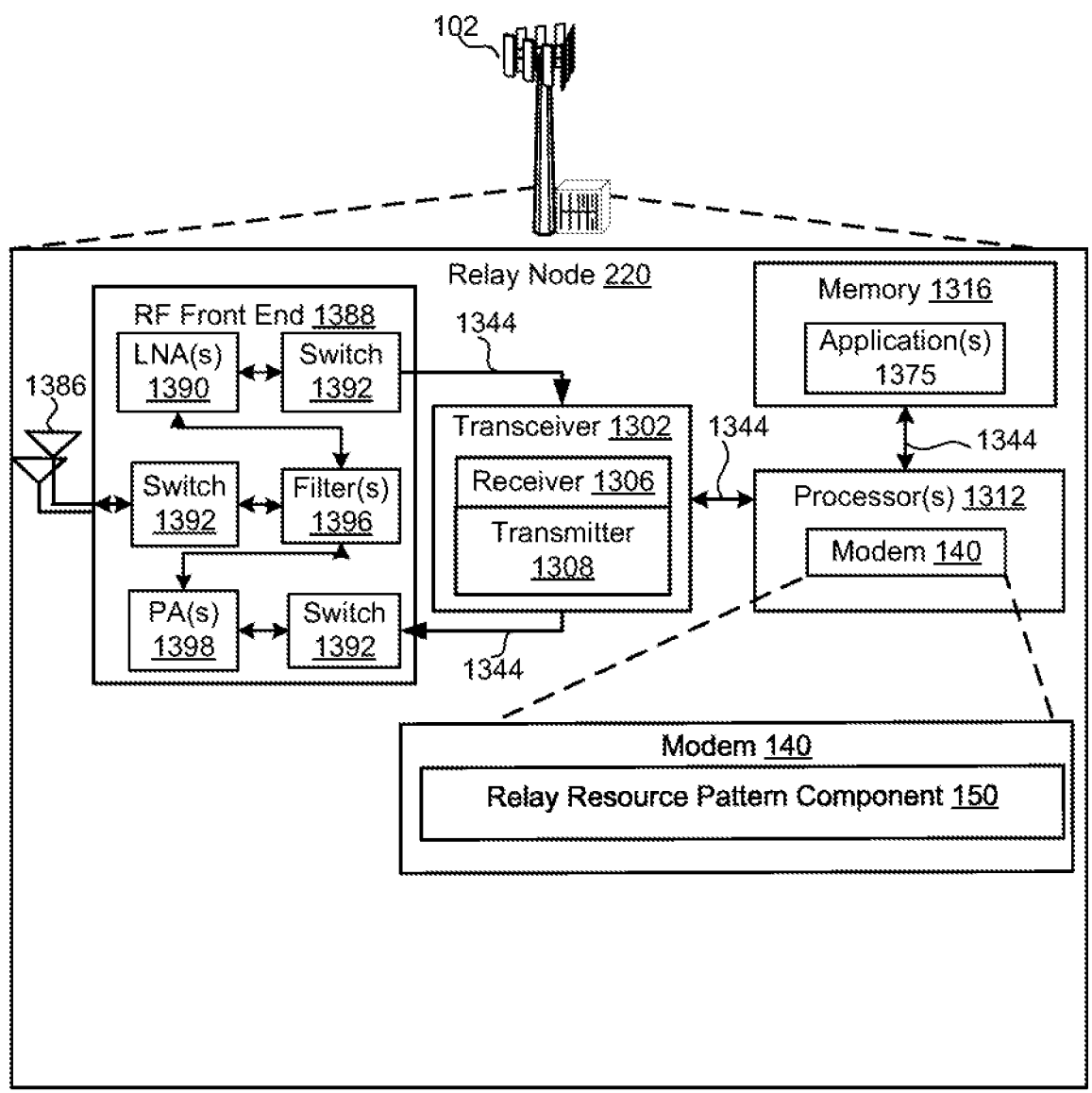
FIG. 13 is a schematic diagram of example components of a IAB-node of FIG. 1A.

Referring to FIG. 13, one example of an implementation of a IAB-node 220 at a base station 102 may include a variety of components, some of which have already been described above, but including components such as one or more processors 1312 and memory 1316 and transceiver 1302 in communication via one or more buses 1344, which may operate in conjunction with modem 140 and relay resource pattern component 150 to enable one or more of the functions described herein. Further, the one or more processors 1312, modem 1314, memory 1316, transceiver 1302, RF front end 1388 and one or more antennas 1386, may be configured to support voice and/or data calls (simultaneously or non-simultaneously) in one or more radio access technologies.

In an aspect, the one or more processors 1312 can include a modem 1314 that uses one or more modem processors. The various functions related to relay resource pattern component 150 may be included in modem 140 and/or processors 1312 and, in an aspect, can be executed by a single processor, while in other aspects, different ones of the functions may be executed by a combination of two or more different processors. For example, in an aspect, the one or more processors 1312 may include any one or any combination of a modem processor, or a baseband processor, or a digital signal processor, or a transmit processor, or a receiver processor, or a transceiver processor associated with transceiver 1302. In other aspects, some of the features of the one or more processors 1312 and/or modem 140 associated with relay resource pattern component 150 may be performed by transceiver 1302.

Also, memory 1316 may be configured to store data used herein and/or local versions of applications 1375 or relay resource pattern component 150 and/or one or more of its subcomponents being executed by at least one processor 1312. Memory 1316 can include any type of computer-readable medium usable by a computer or at least one processor 1312, such as random access memory (RAM), read only memory (ROM), tapes, magnetic discs, optical discs, volatile memory, non-volatile memory, and any combination thereof. In an aspect, for example, memory 1316 may be a non-transitory computer-readable storage medium that stores one or more computer-executable codes defining relay resource pattern component 150 and/or one or more of its subcomponents, and/or data associated therewith, when base station 102 is operating at least one processor 1312 to execute relay resource pattern component 150 and/or one or more of its subcomponents.

Transceiver 1302 may include at least one receiver 1306 and at least one transmitter 1308. Receiver 1306 may include hardware, firmware, and/or software code executable by a processor for receiving data, the code comprising instructions and being stored in a memory (e.g., computer-readable medium). Receiver 1306 may be, for example, a radio frequency (RF) receiver. In an aspect, receiver 1306 may receive signals transmitted by at least one other base station 102. Additionally, receiver 1306 may process such received signals, and also may obtain measurements of the signals, such as, but not limited to, Ec/Io, SNR, RSRP, RSSI, etc. Transmitter 1308 may include hardware, firmware, and/or software code executable by a processor for transmitting data, the code comprising instructions and being stored in a memory (e.g., computer-readable medium). A suitable example of transmitter 1308 may including, but is not limited to, an RF transmitter.

Moreover, in an aspect, IAB-node 220 may include RF front end 1388, which may operate in communication with one or more antennas 1365 and transceiver 1302 for receiving and transmitting radio transmissions, for example, wireless communications transmitted by at least one UE 104 or wireless transmissions transmitted by another base station 102. RF front end 1388 may be connected to one or more antennas 1365 and can include one or more low-noise amplifiers (LNAs) 1390, one or more switches 1392, one or more power amplifiers (PAs) 1398, and one or more filters 1396 for transmitting and receiving RF signals.

In an aspect, LNA 1390 can amplify a received signal at a desired output level. In an aspect, each LNA 1390 may have a specified minimum and maximum gain values. In an aspect, RF front end 1388 may use one or more switches 1392 to select a particular LNA 1390 and its specified gain value based on a desired gain value for a particular application.

Further, for example, one or more PA(s) 1398 may be used by RF front end 1388 to amplify a signal for an RF output at a desired output power level. In an aspect, each PA 1398 may have specified minimum and maximum gain values. In an aspect, RF front end 1388 may use one or more switches 1392 to select a particular PA 1398 and its specified gain value based on a desired gain value for a particular application.

Also, for example, one or more filters 1396 can be used by RF front end 1388 to filter a received signal to obtain an input RF signal. Similarly, in an aspect, for example, a respective filter 1396 can be used to filter an output from a respective PA 1398 to produce an output signal for transmission. In an aspect, each filter 1396 can be connected to a specific LNA 1390 and/or PA 1398. In an aspect, RF front end 1388 can use one or more switches 1392 to select a transmit or receive path using a specified filter 1396, LNA 1390, and/or PA 1398, based on a configuration as specified by transceiver 1302 and/or processor 1312.

As such, transceiver 1302 may be configured to transmit and receive wireless signals through one or more antennas 1365 via RF front end 1388. In an aspect, transceiver may be tuned to operate at specified frequencies such that IAB-node 220 can communicate with, for example, one or more UEs 104 or one or more cells associated with one or more base stations 102. In an aspect, for example, modem 140 can configure transceiver 1302 to operate at a specified frequency and power level based on the base station configuration of the IAB-node 220 and the communication protocol used by modem 140.

In an aspect, modem 140 can be a multiband-multimode modem, which can process digital data and communicate with transceiver 1302 such that the digital data is sent and received using transceiver 1302. In an aspect, modem 140 can be multiband and be configured to support multiple frequency bands for a specific communications protocol. In an aspect, modem 140 can be multimode and be configured to support multiple operating networks and communications protocols. In an aspect, modem 140 can control one or more components of base station 102 (e.g., RF front end 1388, transceiver 1302) to enable transmission and/or reception of signals from the network based on a specified modem configuration. In an aspect, the modem configuration can be based on the mode of the modem and the frequency band in use.

Figure 14:
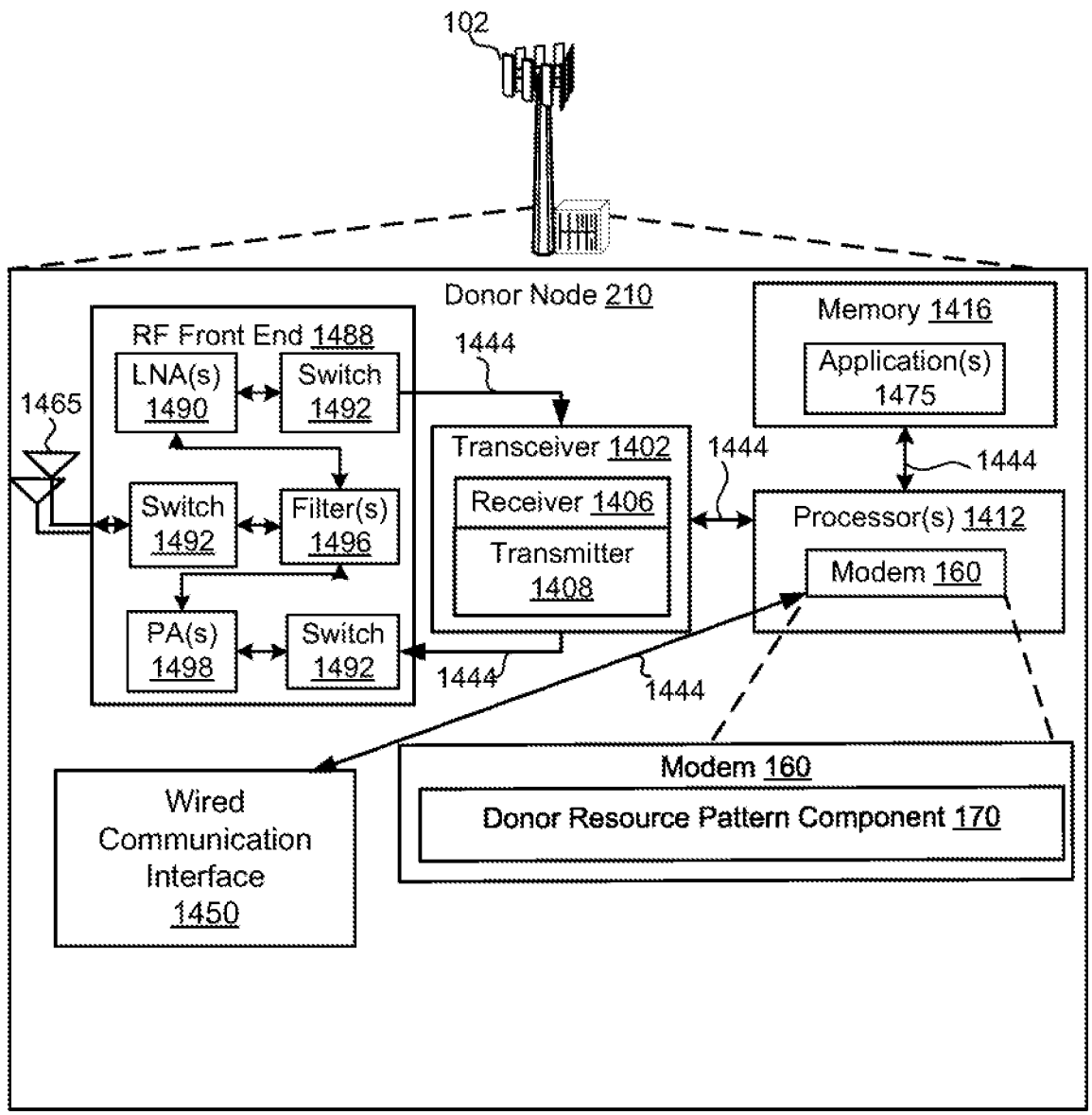
FIG. 14 is a schematic diagram of example components of a donor node of FIG. 1A.

Referring to FIG. 14, one example of an implementation of a base station 102 as a donor node 210 may include a variety of components, some of which have already been described above, but including components such as one or more processors 1412 and memory 1416 and transceiver 1402 in communication via one or more buses 1444, which may operate in conjunction with modem 160 and donor resource pattern component 170 to enable one or more of the functions described herein. In another example, the donor node 210 may include a wired communication interface 1450 which may operate in conjunction with modem 160 and donor resource pattern component 170 to enable one or more of the functions described herein.

The transceiver 1402, receiver 1406, transmitter 1408, one or more processors 1412, memory 1416, applications 1475, buses 1444, RF front end 1488, LNAs 1490, switches 1492, filters 1496, PAs 1498, and one or more antennas 1465 may be the same as or similar to the corresponding components of IAB-node 220, as described above, but configured or otherwise programmed for donor node operations as opposed to IAB-node operations.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communications for a donor node, comprising:
    determining, at a central unit (CU) of the donor node with a direct backhaul link to a core network, a configuration of a resource pattern for a plurality of Integrated-Access and Backhaul (IAB)-nodes of an IAB network, wherein the configuration of the resource pattern includes a base resource pattern configured with a base periodicity of one or more slots and a plurality of distributed unit (DU) slot format indices within the base periodicity, wherein the configuration of the resource pattern further includes one or more overridden resource patterns, each configured to replace the base resource pattern for one or more specified slots, wherein the one or more overridden resource patterns are configured with a scaling factor and a plurality of overridden slots including a slot index and a DU slot format for each of the plurality of overridden slots, wherein the slot index corresponds to a value between 0 and a maximum value calculated based on the base periodicity and the scaling factor; and
    transmitting, by the CU of the donor node, the resource pattern to one or more of the plurality of IAB-nodes of the IAB network.

2. The method of claim 1, wherein the one or more overridden resource patterns are configured at least per a DU of each of the plurality of IAB-nodes of the IAB network, per a DU-cell associated with one or more of the plurality of IAB-nodes of the IAB network, or per child backhaul link of the DU.

3. The method of claim 1, wherein the DU slot format indices corresponds to a table of DU slot formats, the table of the DU slot formats includes a plurality of entries, each entry indicating a pattern of a DU resource type at each symbol within a slot.

4. The method of claim 3, wherein the DU resource type corresponds to at least one of a hard resource, soft resource, or not-available.

5. The method of claim 3, wherein the base resource pattern and an overridden resource pattern is configured in an F1-AP interface for one or more of the plurality of IAB-nodes of the IAB network.

6. The method of claim 3, wherein the base resource pattern is configured per a DU of each of the plurality of IAB-nodes of the IAB network or per a DU-cell associated with one or more of the plurality of IAB-nodes of the IAB network.

7. A method of wireless communications for an Integrated-Access and Backhaul (IAB)-node, comprising:
    receiving, at a distributed unit (DU) of the IAB-node, a resource pattern from a central unit (CU) of an IAB-donor node with a direct backhaul link to a core network via one or more IAB-nodes in an IAB network, the resource pattern including a base resource pattern configured with a base periodicity of two or more slots and a plurality DU slot format indices within the base periodicity, wherein the resource pattern further includes an overridden resource pattern configured to replace the base resource pattern for one or more specified slots, wherein the overridden resource pattern is configured with a scaling factor and a plurality of overridden slots including a slot index and DU slot format for each of the plurality of overridden slots, wherein the slot index corresponds to a value between 0 and a maximum value calculated based on the base periodicity and the scaling factor;
    determining a scheduling behavior based at least on the resource pattern; and
    communicating with one or more additional neighboring IAB-nodes of the IAB network based on the scheduling behavior associated with the resource pattern.

8. The method of claim 7, wherein the overridden resource pattern is configured per a DU of each of a plurality of IAB-nodes of the IAB network or per a DU-cell associated with one or more of the plurality of IAB-nodes of the IAB network.

9. The method of claim 7, wherein the plurality DU slot format indices correspond to a table of DU slot formats, the table of the DU slot formats includes a plurality of entries, each entry indicating a pattern of a DU resource type at each symbol within a slot.

10. The method of claim 9, wherein the DU resource type corresponds to at least one of a hard resource, soft resource, or not-available.

11. The method of claim 9, wherein the base resource pattern is configured in an F1-AP interface for the IAB-node.

12. The method of claim 9, wherein the base resource pattern is configured per the DU of each of a plurality of IAB-nodes of the IAB network or per a DU-cell associated with one or more of the plurality of IAB-nodes of the IAB network.

13. A network entity, comprising:
    a memory storing instructions; and
    a processor in communication with the memory, wherein the processor is configured to execute the instructions to:
        determine, at a central unit (CU) of a donor node with a direct backhaul link to a core network, a configuration of a resource pattern for a plurality of Integrated-Access and Backhaul (IAB)-nodes of an IAB network, wherein the configuration of the resource pattern includes a base resource pattern configured with a base periodicity of one or more slots and a plurality of distributed unit (DU) slot format indices within the base periodicity, wherein the configuration of the resource pattern further includes one or more overridden resource patterns, each configured to replace the base resource pattern for one or more specified slots, wherein the one or more overridden resource patterns are configured with a scaling factor and a plurality of overridden slots including a slot index and a DU slot format for each of the plurality of overridden slots, wherein the slot index corresponds to a value between 0 and a maximum value calculated based on the base periodicity and the scaling factor; and
        transmit, by the CU of the donor node, the resource pattern to one or more of the plurality of IAB-nodes of the IAB network.

14. The network entity of claim 13, wherein the one or more overridden resource patterns are configured at least per a DU of each of the plurality of IAB-nodes of the IAB network, per a DU-cell associated with one or more of the plurality of IAB-nodes of the IAB network, or per child backhaul link of the DU.

15. The network entity of claim 13, wherein the DU slot format indices corresponds to a table of DU slot formats, the table of the DU slot formats includes a plurality of entries, each entry indicating a pattern of a DU resource type at each symbol within a slot.

16. The network entity of claim 15, wherein the DU resource type corresponds to at least one of a hard resource, soft resource, or not-available.

17. A network entity, comprising:

a memory storing instructions; and a processor in communication with the memory, wherein the processor is configured to execute the instructions to:

receive, at a distributed unit (DU) of a Integrated-Access and Backhaul (IAB)-node, a resource pattern from a central unit (CU) of an IAB-donor node with a direct backhaul link to a core network via one or more IAB-nodes in an IAB network, the resource pattern including a base resource pattern configured with a base periodicity of two or more slots and a plurality DU slot format indices within the base periodicity, wherein the resource pattern further includes an overridden resource pattern configured to replace the base resource pattern for one or more specified slots, wherein the overridden resource pattern is configured with a scaling factor and a plurality of overridden slots including a slot index and DU slot format for each of the plurality of overridden slots, wherein the slot index corresponds to a value between 0 and a maximum value calculated based on the base periodicity and the scaling factor;

determine a scheduling behavior based at least on the resource pattern; and communicate with one or more additional neighboring IAB-nodes of the IAB network based on the scheduling behavior associated with the resource pattern.

18. The network entity of claim 17, wherein the overridden resource pattern is configured per the DU of each of a plurality of IAB-nodes of the IAB network or per a DU-cell associated with one or more of the plurality of IAB-nodes of the IAB network.

19. The network entity of claim 17, wherein the plurality DU slot format indices correspond to a table of DU slot formats, the table of the DU slot formats includes a plurality of entries, each entry indicating a pattern of a DU resource type at each symbol within a slot.

20. The network entity of claim 19, wherein the DU resource type corresponds to at least one of a hard resource, soft resource, or not-available.

* * * * *